UNITED STATES PATENT OFFICE.

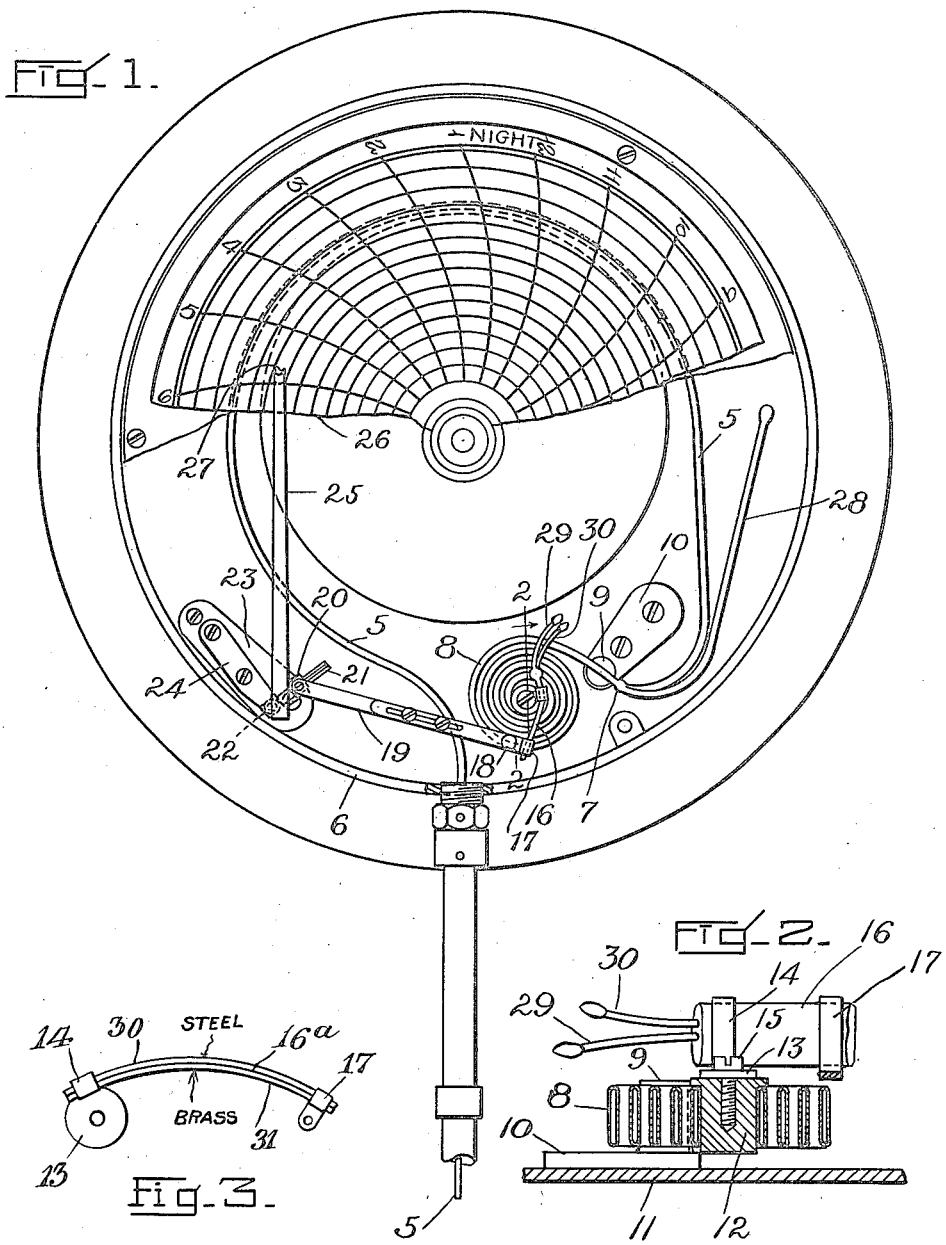

FRANK H. HOPKINS, OF SOMERVILLE, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

COMPENSATING THERMOMETER.

1,404,771. Specification of Letters Patent. Patented Jan. 31, 1922.

Application filed July 11, 1917. Serial No. 179,882.

*To all whom it may concern:*

Be it known that I, FRANK H. HOPKINS, a citizen of the United States, residing at Somerville, in the county of Middlesex and State of Massachusetts, have invented new and useful Improvements in Compensating Thermometers, of which the following is a specification.

The present invention relates to thermometers of the type which has a mechanical indicator moved by fluid pressures which are generated by heat and modified by temperature changes. The principal object of the invention is to provide a means for compensating for changes in temperature at the location of the indicating instrument, whereby the errors which would be occasioned otherwise in any case where the indicating element or instrument is subjected to an inconstant temperature, are avoided. Other objects are to produce various improvements in the functioning parts of instruments of this nature, all of which appear in the following detailed description and in the claims. The principles of my invention are applicable to any thermometer in which fluid pressure is operable to move an index of any type, whether the same be adapted to make a permanent record, or is a temporary index. The instrument which I have chosen to illustrate herein is of the recording type. In the drawings, Figure 1 is an elevation of an instrument for indicating and recording temperatures, in which the principles of my invention are applied.

Figure 2 is a detail sectional view on a larger scale, taken on line 2—2 of Figure 1.

Figure 3 is a plan view of a modified construction of compensating arm.

The same reference characters indicate the same parts in all the figures.

The portion of the thermometer in which my invention is comprised is the indicator part, which may be associated with or remote from that part which is directly affected by the temperatures measured. The latter part may be a bulb or chamber of any sort containing any sort of fluid, liquid or gaseous, which is expansible by heat and capable of transmitting pressures, in other words practically any fluid whatever. A tube of any length according to the duty required leads from such bulb or chamber to the indicator. Said tube is indicated in the drawings by the numeral 5. It passes into a case 6 which may be like the case of the well known Bourdon type of pressure gage and is disposed in said case in any convenient way so as to make connection at the point 7 with a spring tube 8 flattened in cross section and formed into a coil which is mounted in a holder 9. Said holder is provided with a base portion 10 which is secured in any convenient manner to the back wall 11 (Figure 2) of the case and grips the coiled tube 8 near one of its ends so as to hold it rigidly. The opposite end of the coiled spring tube, in this case the inner end, embraces and is secured to a block 12, said block being supported by the spring tube and so held that it is rotated more or less in one direction or the other by distortions of the spring tube resulting from variations in the pressure of the contained fluid. On this block is mounted the base part 13 of a clamp 14, by means of a screw 15 which may be loosened to permit adjustment of the clamp about the axis of the screw, and tightened to secure the clamp in the adjusted position.

This clamp carries an arm 16, which is also a tube flattened in cross section, and closed at both ends, and on which is a clamp 17 connected by a pivot 18 with a link 19, the latter being extensible in length in a manner common in pressure gages and other instruments of like character, and being pivoted at its other end to a block 20 which is adjustably mounted on an arm 21. Said arm is secured to a rock shaft 22 mounted in bearings in the plates 23 and 24 which are secured to the back plate of the case 6, and this rock shaft carries an arm 25 which is arranged to swing over a dial 26 and carries a marking pen 27 adapted to trace a record on the dial. The latter is rotated uniformly by any sort of mechanism suitable for the purpose. I have not illustrated such mechanism because any of the common driving mechanisms used in recording thermometers, gages, and similar instruments may be applied to this instrument. The arm 25, although specifically a pen-carrying arm, is generically an index and may be considered as typifying any indicator capable of moving and of showing with reference to a scale, a dial, or other measuring means, the temperatures which affect the thermometer.

28 is a tube for filling the conduit 5 and making good any losses of fluid therefrom, and 29 and 30 represent similar tubes for performing a like office for the tubular arm 16.

The index is placed or moved so as to indicate temperatures by the fluid pressure transmitted through the tube 5. Such fluid acting on the coiled spring tube 8 expands or contracts such coiled tube, or allows the coil to expand or contract, according as the controlling temperature is raised or lowered. In other words, increase of temperature tends to straighten the coil and a diminution of pressure causes or permits it to become more closely coiled. The result is to turn the block 12 more or less about an axis substantially in the center of the coil. Thus the arm 16 is turned in one direction or the other through a greater or small angle and the indicator 25 is correspondingly moved by the intermediate mechanism. It has been already stated that the arm 16 is a tube closed at both ends, and it will be noted that it is also curved. By reason of this curvature it compensates for errors due to variations in the temperature to which the indicator instrument is subjected. If the temperature at the location of this instrument should rise, the fluid in the coil 8 would be expanded, and would cause movement of the indicator 25 additional to that caused by the temperature to be measured, and a similar but opposite movement would be given by lowering of the temperature at this location, except for the curved tubular arm 16. The latter is also affected by temperature changes by reason of the contained fluid, the pressure of which tends to straighten the arm when the temperature rises, and to increase the curvature of the arm when the temperature is lowered. The movement given thereby to that point in the arm which is connected with the link 19 is equal and opposite to the movement given by the coil 8 under the same temperature change, whereby the point of connection 18 between the arm and link remains stationary.

I do not limit that feature of my invention which is comprised in the compensating arm 16 to an arm made as a tube containing fluid, since equivalent results could be obtained by arms of other construction which are adapted to be distorted by changes in temperature. For example, the arm might be composed of two strips or plates of dissimilar metals arranged side by side and connected together at their ends, or preferably throughout their entire length, as in well known and commonly used forms of thermostat, so as to be altered in curvature with temperature changes. One such equivalent arm is shown in Figure 3, designated 16ª, and represented as composed of strips 30 and 31 made of resilient materials having respectively different coefficients of expansion; such as steel and brass, for instance.

In this connection the term "curve" or "curvature" does not constitute a limitation or exclude structures which in some conditions of temperature are straight, because for the purpose of my present invention, and of the claims the arm when straight is considered to be curved on an arc of infinite radius. The changes which are caused in the compensating arm by temperature variations, essentially shorten or lengthen such radius of curvature.

Where the curved arm is a tube filled with fluid, the fluid there employed would ordinarily be such as to have a greater coefficient of expansion than that in the coil 8, inasmuch as the arm is much shorter than the total length of the tube forming the coil.

It is appreciated of course, and shown in the drawings, that both the tubular arm and the coiled tube are flattened in cross section in the same manner as the familiar Bourdon spring.

What I claim and desire to secure by Letters Patent is:

1. A compensating thermometer comprising a flattened spring tube containing pressure-transmitting fluid and formed in a coil having several turns, a holder to which the outer turn of said coil is fixed, and a thermostatic arm connected at one end to the end of said tube at the interior of said coil and adapted to apply force from its opposite end, said arm being constructed to cause a shifting of its said opposite end under local temperature changes equal and opposite to the shifting of the same end caused under the same conditions by distortion of the coil.

2. A temperature indicator comprising a flattened spring tube formed into a coil and fixed at the outer turn of the coil, means for admitting pressure-transmitting fluid to one end of said coil, the other end being closed, a block at the center of said coil to which the inner end of the tube is secured, an arm mounted on said block and an index operably connected to a part of said arm, said arm being constructed with provisions for effecting changes in its curvature with local temperature changes and being of such length and so placed that the part thereof which is connected to the index is thereby caused to move equally and oppositely to the movement given to said part by distortions of the coil by the same temperature changes.

3. In a mechanical thermometer, a flattened spring tube formed into a coil and fixed at that end which is at the outside of the coil, the end at the approximate center of the coil being closed and free to move, a fluid-containing pressure-transmitting conduit connected to the fixed end of said tube, an arm fastened to the inner end of the tube and being rotatable therewith about the axis of the coil with differences of pressure therein, and an index operably connected with said arm at a point remote from the point of connection of the latter with the tube, said arm being so constructed as to alter its shape under different conditions of local temperature.

4. In a mechanical thermometer, a flattened spring tube formed into a coil and fixed at that end which is at the outside of the coil, the end at the approximate center of the coil being closed and free to move, a fluid-containing pressure-transmitting conduit connected to the fixed end of said tube, an arm fastened to the inner end of the tube, and an index operably connected with said arm at a point remote from the point of connection of the latter with the tube, said arm being curved and of a construction such that the radius of its curvature is changed with changes of local temperature.

5. In a mechanical theremometer, a coiled spring tube fixed at that end which is at the outside of the coil, the end at the approximate center of the coil being closed and free to move, a fluid-containing pressure-transmitting conduit connected to the fixed end of said tube, an arm fastened to the inner end of the coil tube and an index operably connected with said arm at a point remote from the point of connection of the latter with the tube, said arm being tubular flattened in cross section and curved in shape, closed at both ends, and containing a body of fluid.

6. A compensating mechanical thermometer including a conduit containing pressure-transmitting fluid, a coiled flattened tube fixed at its outer end and there connected to said conduit, its inner end being closed and located at approximately the center of the coil and being free to move, a clamp connected pivotally to said closed end and being angularly adjustable about its pivotal connection, a curved flattened spring tubular arm closed at both ends filled with fluid and connected near one end to said clamp, and an index connected with the other end of said tubular arm, the curvature of said arm being reversed with respect to that of the coiled tube, whereby its distortion due to temperature changes compensates for the effect of distortion of the coiled tube by the same temperature changes.

7. A compensating mechanical thermometer including a conduit containing pressure-transmitting fluid, a coiled flattened tube fixed at its outer end and there connected to said conduit, its inner end being closed and located at approximately the center of the coil and being free to move, a clamp connected pivotally to said closed end and being angularly adjustable about its pivotal connection, a curved flattened spring tubular arm closed at both ends filled with fluid and connected near one end to said clamp, and an index connected with the other end of said tubular arm, the curvature of said arm being reversed with respect to that of the coiled tube, said arm being shorter than the coiled tube and the fluid contained therein having a greater coefficient of expansion than that in the coiled tube, whereby its distortion due to temperature changes compensates for the effect of distortion of the coiled tube by the same temperature changes.

8. A temperature-compensating pressure-responsive indicating instrument comprising a curved flattened spring tube containing pressure transmitting fluid and fixed at one end, the other end being free to move in response to pressure variations, means for transmitting pressure to the fluid contained in said tube, an index, and a thermostatic arm operatively connected near one end with said index and mounted normally in a fixed manner near its other end upon the movable part of the tube and at one side of the plane in which said tube is curved and being so curved, of such length, and extending in such direction that its distortion by temperature changes neutralizes the tendency of distortion of the coiled tube by the same temperature changes to shift that part of it which is connected to the index.

9. A temperature-compensating pressure-responsive indicating instrument comprising a curved flattened spring tube containing pressure transmitting fluid and fixed at one end, the other end being free to move in response to pressure variations, means for transmitting pressure to the fluid contained in said tube, an index and a thermostatic arm operatively connected near one end with said index and rigidly secured near its opposite end to the movable part of the tube; said arm being arranged for distortion oppositely to that of the curved tube under local temperature changes and of such length that the movements of its point of connection with the index by such distortion substantially neutralize the effect at such point due to distortion of the curved tube under the same local temperature changes.

In testimony whereof I have affixed my signature.

FRANK H. HOPKINS.